(12) United States Patent
Chen et al.

(10) Patent No.: US 12,065,139 B2
(45) Date of Patent: Aug. 20, 2024

(54) SYSTEM AND METHOD FOR COMPLETING RISK OBJECT IDENTIFICATION

(71) Applicant: Honda Motor Co., Ltd., Tokyo (JP)

(72) Inventors: Yi-Ting Chen, Sunnyvale, CA (US); Zihao Xiao, Baltimore, MD (US)

(73) Assignee: HONDA MOTOR CO., LTD., Tokyo (JP)

( * ) Notice: Subject to any disclaimer, the term of this patent is extended or adjusted under 35 U.S.C. 154(b) by 322 days.

(21) Appl. No.: 17/161,555

(22) Filed: Jan. 28, 2021

(65) Prior Publication Data

US 2022/0144260 A1 May 12, 2022

Related U.S. Application Data

(60) Provisional application No. 63/111,992, filed on Nov. 10, 2020.

(51) Int. Cl.
| | | |
|---|---|---|
| *B60W 30/095* | (2012.01) | |
| *B60W 50/10* | (2012.01) | |
| *B60W 50/14* | (2020.01) | |
| *G06N 3/04* | (2023.01) | |
| *G06T 7/38* | (2017.01) | |

(52) U.S. Cl.
CPC ........ *B60W 30/0956* (2013.01); *B60W 50/10* (2013.01); *B60W 50/14* (2013.01); *G06N 3/04* (2013.01); *G06T 7/38* (2017.01); *B60W 2420/403* (2013.01); *B60W 2554/20* (2020.02); *B60W 2554/404* (2020.02)

(58) Field of Classification Search
CPC .. B60W 30/0956; B60W 50/10; B60W 50/14; B60W 2420/42; B60W 2554/20; B60W 2554/404; G06N 3/04; G06T 7/38
See application file for complete search history.

(56) References Cited

U.S. PATENT DOCUMENTS

| | | | |
|---|---|---|---|
| 2015/0035828 A1* | 2/2015 | Fradet | H04N 13/194 345/421 |
| 2017/0300737 A1* | 10/2017 | Wang | G06V 30/274 |
| 2018/0032082 A1* | 2/2018 | Shalev-Shwartz | G05D 1/0246 |
| 2018/0315209 A1* | 11/2018 | Murphy-Chutorian | G06T 7/70 |
| 2019/0064810 A1* | 2/2019 | Jiang | G05D 1/0088 |

(Continued)

OTHER PUBLICATIONS

S. Casas et al., "IntentNet: Learning to Predict Intention from Raw Sensor Data," 2nd Conference on Robot Learning, CoRL 2018 (arXiv:2101.07907v1).

(Continued)

*Primary Examiner* — Maceeh Anwari
(74) *Attorney, Agent, or Firm* — RANKIN, HILL & CLARK LLP

(57) ABSTRACT

A system and method for completing risk object identification that include receiving image data associated with a monocular image of a surrounding environment of an ego vehicle and analyzing the image data and completing semantic waypoint labeling of at least one region of the surrounding environment of the ego vehicle. The system and method also include completing counterfactual scenario augmentation with respect to the at least one region. The system and method further include determining at least one driver intention and at least one driver response associated with the at least one region.

20 Claims, 8 Drawing Sheets

(56) References Cited

U.S. PATENT DOCUMENTS

| | | | | |
|---|---|---|---|---|
| 2019/0266418 | A1* | 8/2019 | Xu | G06T 7/10 |
| 2019/0283746 | A1* | 9/2019 | Shalev-Shwartz | G06V 40/25 |
| 2019/0291728 | A1* | 9/2019 | Shalev-Shwartz | B60T 7/18 |
| 2019/0377354 | A1* | 12/2019 | Shalev-Shwartz | B60W 30/0956 |
| 2019/0384304 | A1* | 12/2019 | Towal | G06N 3/045 |
| 2020/0391738 | A1* | 12/2020 | Isele | B60W 60/00276 |
| 2021/0276589 | A1* | 9/2021 | Zhu | B60W 30/0956 |
| 2021/0303922 | A1* | 9/2021 | Tu | G01S 17/894 |
| 2022/0126873 | A1* | 4/2022 | Alghanem | G06V 20/58 |
| 2022/0135026 | A1* | 5/2022 | Schleede | B60W 60/0015 701/26 |

OTHER PUBLICATIONS

A. Doshi et al., "On-Road Prediction of Driver's Intent with Multimodal Sensory Cues," Pervasive Computing, IV 2011.

Y. Hu et al., "Probabilistic Prediction of Vehicle Semantic Intention and Motion," 2018 IEEE Intelligent Vehicles (IV) Symposium (arXiv:1804.03629v1).

A. Jain et al., "Car that Knows Before You Do: Anticipating Maneuvers via Learning Temporal Driving Models," ICCV 2015 (arXiv:1504.02789v2).

C. Li et al., "Who Make Drivers Stop? Towards Driver-centric Risk Assessment: Risk Object Identification via Causal Inference," International Conference on Intelligent Robots and Systems (IROS) 2020 (arXiv:2003.02425v2).

J. Philion and S. Fidler, "Lift, Splat, Shoot: Encoding Images from Arbitrary Camera Rigs by Implicitly Unprojecting to 3D," ECCV 2020 (arXiv:2008.05711v1).

T. Roddick and R. Cipolla, "Predicting Semantic Map from Images using Pyramid Occupancy Networks," Computer Vision and Pattern Recognition (CVPR) 2020 (arXiv:2003.13402v1).

J. Schönberger et al., "Structure-from-Motion Revisited," Proceedings of the IEEE Conference on Computer Vision and Pattern Recognition (CVPR), 2016, pp. 4104-4113.

Z. Wang et al., "A Parametric Top-View Representation of Complex Road Scenes," CVPR 2019 (arXiv:1812.06152v2).

M. Xu et al., "Temporal Recurrent Networks for Online Action Detection," ICCV 2019.

* cited by examiner

SYSTEM AND METHOD FOR COMPLETING RISK OBJECT IDENTIFICATION

CROSS-REFERENCE TO RELATED APPLICATION

This application claims priority to U.S. Provisional Application Ser. No. 63/111,992 filed on Nov. 10, 2020, which is expressly incorporated herein by reference.

BACKGROUND

Risk object identification may be an essential step towards driver centric risk assessment. Human drivers may have the capability to identify risk objects and assess their risk. For instance, while turning left at an intersection, drivers may be able to attend to relevant objects (e.g., oncoming vehicles or crossing pedestrians) and assess their risk for decision making. In such scenarios, without understanding of the driver's intentions with respect to navigating a vehicle and their understanding of risk objects it may be difficult to implement realistic human level ability with respect to driving behavior to provide a higher level of autonomous navigation.

BRIEF DESCRIPTION

According to one aspect, a computer-implemented method for completing risk object identification that includes receiving image data associated with a monocular image of a surrounding environment of an ego vehicle and analyzing the image data and completing semantic waypoint labeling of at least one region of the surrounding environment of the ego vehicle. The computer-implemented method also includes completing counterfactual scenario augmentation with respect to the at least one region. The counterfactual scenario augmentation includes an augmentation of an object at the at least one region. The computer-implemented method further includes determining at least one driver intention and at least one driver response associated with the at least one region.

According to another aspect, a system for completing risk object identification that includes a memory storing instructions when executed by a processor cause the processor to receive image data associated with a monocular image of a surrounding environment of an ego vehicle and analyze the image data and completing semantic waypoint labeling of at least one region of the surrounding environment of the ego vehicle. The instructions also cause the processor to complete counterfactual scenario augmentation with respect to the at least one region. The counterfactual scenario augmentation includes an augmentation of an object at the at least one region. The system further includes determine at least one driver intention and at least one driver response associated with the at least one region.

According to yet another aspect, a non-transitory computer readable storage medium storing instructions that when executed by a computer, which includes a processor perform a method that includes receiving image data associated with a monocular image of a surrounding environment of an ego vehicle and analyzing the image data and completing semantic waypoint labeling of at least one region of the surrounding environment of the ego vehicle. The method also includes completing counterfactual scenario augmentation with respect to the at least one region. The counterfactual scenario augmentation includes an augmentation of an object at the at least one region. The method further includes determining at least one driver intention and at least one driver response associated with the at least one region.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
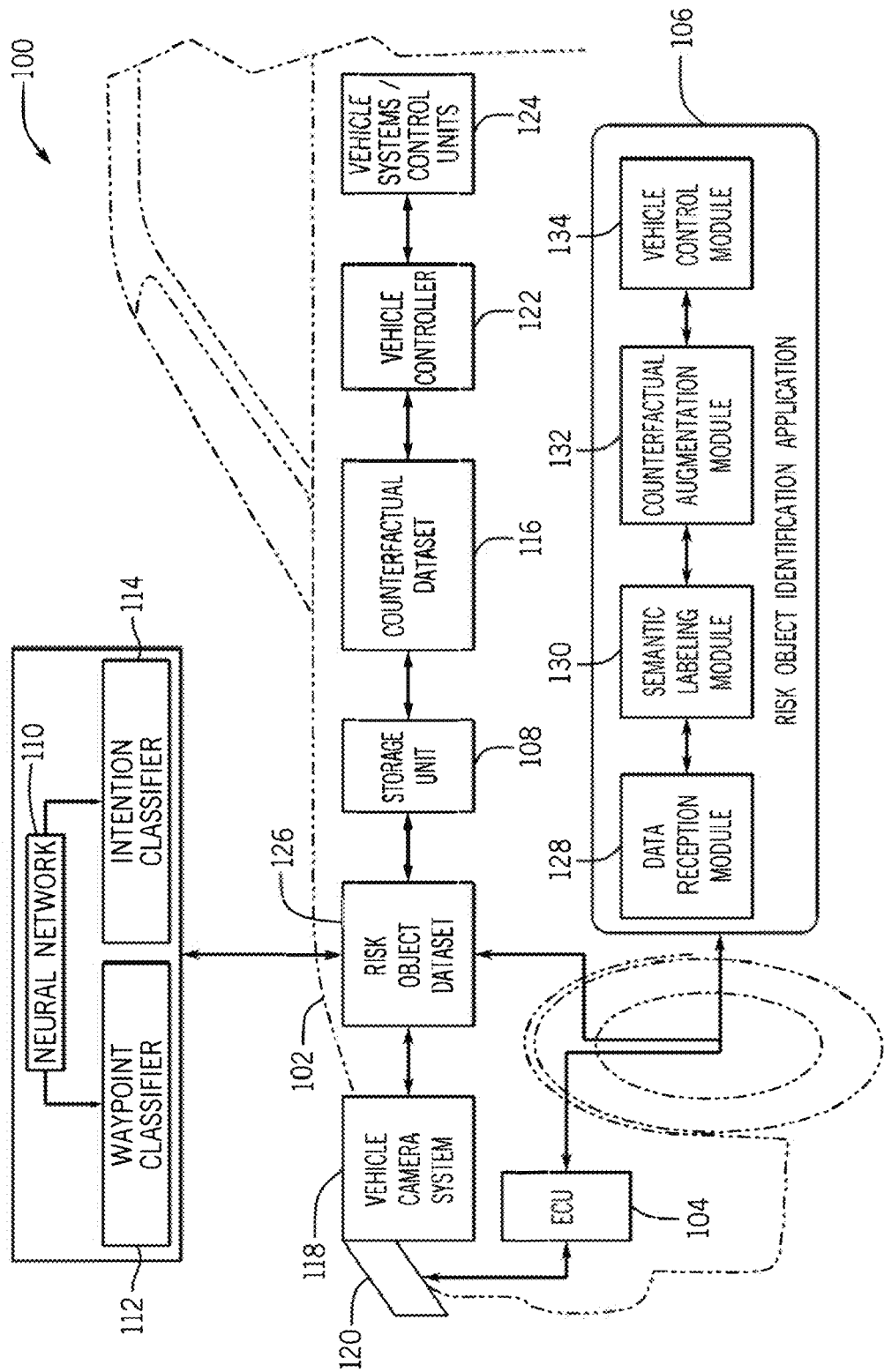
FIG. 1 is a schematic view of the operating environment for completing risk object identification that pertains to an operation of an ego vehicle according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others. Computer communication may also include an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Object", as used herein, refers to any items in the roadway and may include proximate vehicles, pedestrians crossing the roadway, other vehicles, obstacles, animals, debris, potholes, etc. Further, an 'object may include most any traffic conditions, road conditions, weather conditions, etc. Examples of objects may include, but are not necessarily limited to other vehicles (e.g., proximate vehicle), buildings, landmarks, obstructions in the roadway, road segments, intersections, etc. Thus, objects may be found, detected, or associated with a path, one or more road segments, etc. along a route on which an ego vehicle is travelling or is projected to travel along.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, drones, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

I. System Overview

Referring now to the drawings, wherein the showings are for purposes of illustrating one or more exemplary embodiments and not for purposes of limiting same, FIG. 1 is a schematic view of the operating environment 100 for completing risk object identification that pertains to an operation of an ego vehicle 102 according to an exemplary embodiment of the present disclosure. The components of the operating environment 100, as well as the components of other systems, hardware architectures, and software architectures discussed herein, may be combined, omitted, or organized into different architectures for various embodiments.

Generally, the operating environment 100 includes the ego vehicle 102 with an electronic control unit (ECU) 104 that executes one or more applications, operating systems, vehicle system and subsystem user interfaces, among others. The ECU 104 may also execute a risk object identification application 106 that may be configured to utilize semantic templates and counterfactual virtual object road scene augmentation to complete driving scene risk object identification with respect to the operation of the ego vehicle 102 within a surrounding environment of the ego vehicle 102. The surrounding environment of the ego vehicle 102 may be defined as a predetermined area located around (front/sides/behind) the ego vehicle 102 (e.g., road environment in front, sides, and/or behind of the ego vehicle 102) that may be included within the ego vehicle's travel path.

The risk object identification application 106 may be configured to utilize machine learning/deep learning techniques to analyze one or more molecular images that are captured of the surrounding environment as the ego vehicle 102 is being operated. As discussed below, the one or more molecular images may be analyzed to determine a road topology of one or more roadways that are included within the surrounding environment of the ego vehicle 102. The risk object identification application 106 may be configured to evaluate the road topology of the one or more roadways of the surrounding environment to determine a plurality of semantic regions that may exist in a plurality of locations of the one or more roadways.

As discussed in more detail below, the risk object identification application 106 may be configured to complete waypoint labeling of each of the plurality of semantic regions. The plurality of semantic regions may pertain to one or more waypoints that may be utilized as possible regions at which the ego vehicle 102 may travel to reach a particular location (e.g., goal, destination). For example, when the surrounding environment of the ego vehicle 102 includes a four-way intersection, the semantic regions may include areas of one or more roadways of the four-way intersection that may be used by the ego vehicle 102 as it crosses through the intersection.

In one embodiment, the risk object identification application 106 may predict or track one or more paths of the ego vehicle 102 through one or more semantic regions and may output a plurality of semantic waypoint labels that may be associated with the predicted or tracked path of the ego vehicle 102. Upon outputting the plurality of semantic labels that may be associated with the semantic regions, the risk object identification application 106 may be configured to complete counterfactual scenario augmentation with respect to one or more of the semantic regions that are within the path of the ego vehicle 102. As discussed below, the counterfactual scenario augmentation may graphically augment one or more static or dynamic objects that may be included within one or more respective semantic regions. The augmentation of one or more objects may include inpainting of one or more static objects and/or one or more dynamic objects that may occur at various regions and in various manners.

The risk object identification application 106 may be configured to analyze various scenarios based on various types of counterfactual scenario augmentation of various dynamic and/or static objects at various semantic regions that may be associated with the predicted or tracked path of the ego vehicle 102 to determine one or more driver intentions that may associated with the travel path of the ego vehicle 102 within one or more semantic regions. The one or more driver intentions may be determined as driving intentions that are influenced by the road topology of one or more roadways as determined based on the semantic waypoint labeling and an attention of a driver (not shown) of the ego vehicle 102 on the augmented static objects or dynamic objects that are provided based on the counterfactual scenario augmentation. For example, if the driver is making a left hand turn in a four-way intersection, the driver's attention may be given on those objects that are relevant towards that maneuver and the driver's intentions may be based on whether the objects are going to have an impact on the travel path and operation of the ego vehicle 102.

Additionally, the risk object identification application 106 may be configured to determine one or more driver responses that may be associated with one or more semantic regions. The one or more driver responses may be determined as driving reactions that may be based on the road topology and the driver's driving response (e.g., braking, swerving, accelerating) to the augmented static objects or dynamic objects. For example, if the driver is making a left hand turn in a four-way intersection, one or more driving reactions of slowing down, swerving, and/or stopping may be completed based on the presence of one or more static objects and/or one or more dynamic objects that may be located within or near the travel path of the ego vehicle 102.

In one or more embodiments, the risk object identification application 106 may be configured to operably control one or more systems of the ego vehicle 102 based on one or more driver intentions and/or one or more driver responses as determined by the application 106. As discussed below, the ego vehicle 102 may be operably controlled to provide one or more alerts to the driver of the ego vehicle 102 and/or be autonomously or semi-autonomously operated. Accordingly, through the execution of road topology modeling and counterfactual scenario generation the performance of risk object identification may be increased and the ego vehicle 102 may be operably controlled to provide warnings and/or navigate based on potential intentions and/or responses of the driver of the ego vehicle 102.

With continued reference to FIG. 1, in an exemplary embodiment, the ECU 104 may be configured to operably control the plurality of components of the ego vehicle 102. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego vehicle 102.

The ECU 104 may additionally include a communication device (not shown) for sending data internally within (e.g., between one or more components) the ego vehicle 102 and communicating with externally hosted computing systems (e.g., external to the ego vehicle 102). Generally, the ECU 104 may communicate with the storage unit 108 of the ego vehicle 102 to execute the one or more applications, operating systems, ego vehicle system and subsystem user interfaces, and the like that are stored within the storage unit 108. In an exemplary embodiment, the storage unit 108 may be configured to store a neural network 110 and one or more components of the neural network 110.

In one or more embodiments, the neural network 110 may be configured as an artificial recurrent neural network (RNN) architecture that is configured with a long short-term memory unit (LSTM). The neural network 110 may be configured to execute temporal rational reasoning of image data based on one or more monocular images that may be captured of the surrounding environment of the ego vehicle 102. Upon executing temporal rational reasoning of the image data, decoder LSTMs of the neural network 110 may be configured to execute a waypoint classifier 112 to complete semantic waypoint labeling with respect to a plurality of semantic regions that may pertain to one or more waypoints that may be utilized as possible regions at which the ego vehicle 102 may travel to reach a particular location.

In one embodiment, the neural network 110 may utilize the waypoint classifier 112 to model and determine the road topology of the surrounding environment of the ego vehicle 102 and to complete semantic waypoint labeling of the roadways within the surrounding environment. The semantic waypoint labeling may be completed based on a pre-trained dataset that may include numerous roadway scenarios. As discussed below, the risk object identification application 106 may be configured to access the neural network 110 to complete a semantic 3D reconstruction of the surrounding environment of the ego vehicle 102 based on the analysis of the monocular image of the surrounding environment. The neural network 110 may utilize the waypoint classifier 112 to complete semantic waypoint labeling of a plurality of semantic regions that may pertain to one or more waypoints that may be utilized as possible regions at which the ego vehicle 102 may travel to reach a particular location.

The neural network 110 may further be utilized to execute machine learning/deep learning techniques to complete counterfactual scenario augmentation with respect to one or more of the semantic regions. Accordingly, the risk object identification application 106 may be configured to complete counterfactual scenario augmentation with respect to one or more of the semantic regions that are within the path of the ego vehicle 102 to augment one or more static objects and/or one or more dynamic objects that may be included within one or more respective semantic regions. The augmentation of one or more objects may include inpainting of one or more static objects and/or one or more dynamic objects that may occur at various regions and in various manners (shown in FIG. 5, discussed below).

The neural network 110 may additionally include an intention classifier 114. The neural network 110 may access the intention classifier 114 to determine one or more driver intentions and/or one or more driver responses. In one configuration, the intention classifier 114 may be configured to analyze the road topology of one or more roadways and the counterfactual augmentation of one or more dynamic objects and/or one or more static objects to determine the driver's intention and driver's response. As discussed below, the application 106 may operably control one or more systems of the ego vehicle 102 based on the driver's intentions and/or driver's responses as determined by the intention classifier 114.

In an exemplary embodiment, the ego vehicle 102 includes a vehicle camera system 118 that may provide image data associated with one or more monocular images of the surrounding environment of the ego vehicle 102 that are captured by one or more monocular cameras 120 of the vehicle camera system 118. The one or more monocular cameras 120 may be disposed at external front portions of the ego vehicle 102, including, but not limited to different portions of the vehicle dashboard, vehicle bumper, vehicle front lighting units, vehicle fenders, and the windshield to capture monocular images of one or more areas of the surrounding environment of the ego vehicle 102. Based on the monocular images captured by the one or more monocular cameras 120, the vehicle camera system 118 may be configured to detect objects, detect lane boundaries, and track objects that are located within the surrounding environment of the ego vehicle 102. The vehicle camera system 118 may be configured to package the detections into image data that is provided to the risk object identification application 106.

Figure 2:
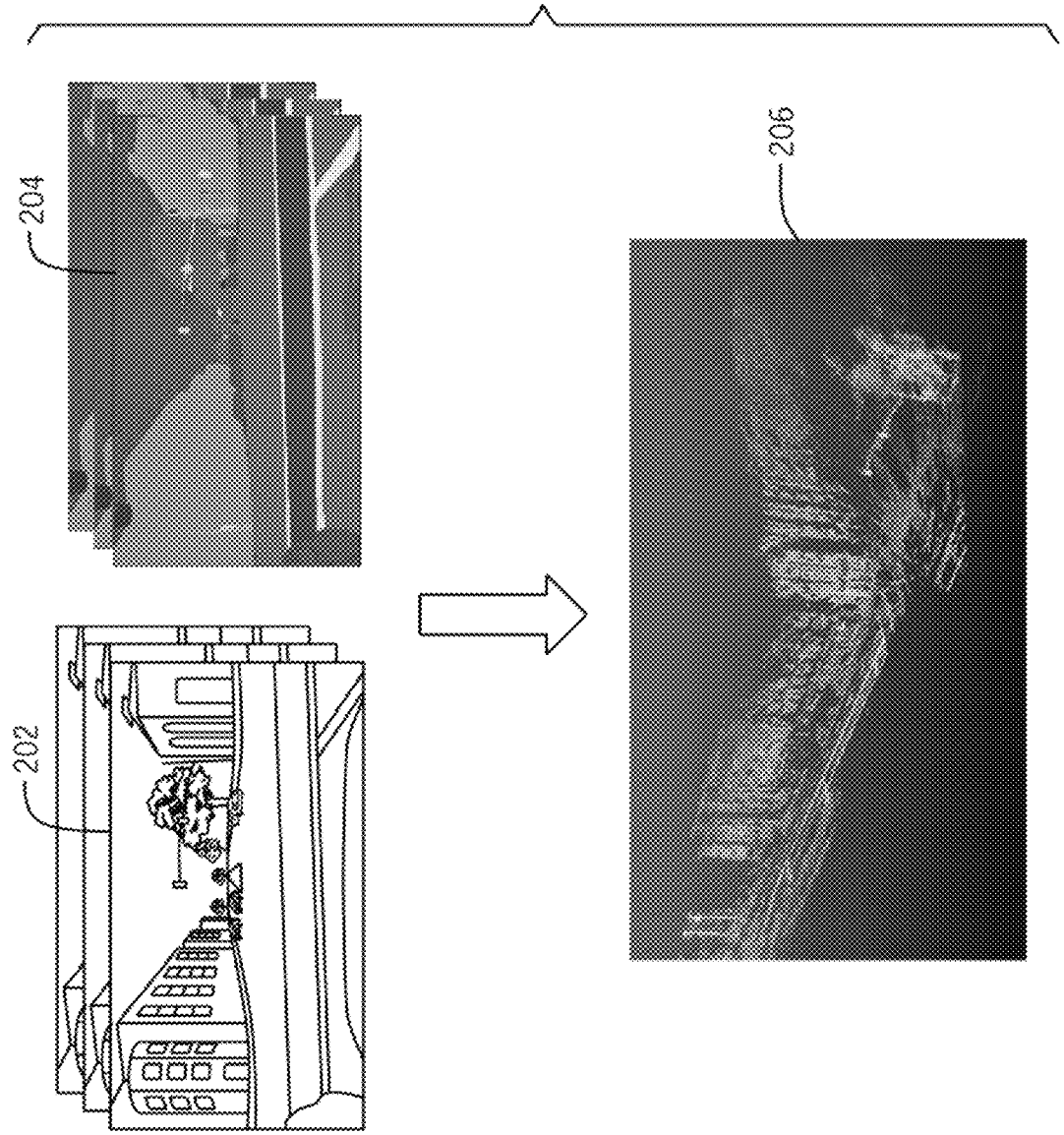
FIG. 2 is an illustrative example of monocular images and a point cloud projection associated with the surrounding environment of the ego vehicle according to an exemplary embodiment of the present disclosure.

In one embodiment, the image data provided by the vehicle camera system 118 may be analyzed by the risk object identification application 106 to complete semantic three dimensional reconstruction of the one or more monocular images of the surrounding environment of the ego vehicle 102. With reference to FIG. 2, the one or more monocular images 202 may be received in the form of image data by the risk object identification application 106. In one embodiment, the risk object identification application 106 may be configured to execute image logic to process a structure from motion three dimensional reconstruction of the one or more monocular images. As shown, image data may be analyzed to determine roadway topology and features of the surrounding environment (e.g., cross walks, traffic lights). Such features may be shown in corresponding RGB colors 204 (shown as different shades) that are configured to provide rich information about object appearance, as well as relationships and interactions between objects and the surrounding environment.

In an exemplary embodiment, the neural network 110 may be configured to analyze the RGB colors 204 that are configured to provide rich information about object appearance to determine a point cloud projection 206 associated with the surrounding environment of the ego vehicle 102. As shown, the point cloud projection 206 may include a plurality of points that may be associated with various features (e.g., buildings, cross walk) of the surrounding environment of the ego vehicle 102. The point cloud projection 206 may include a plurality of points that represent a 3D shape or object that each include a set of X, Y, and Z three-dimensional coordinates.

Figure 3:
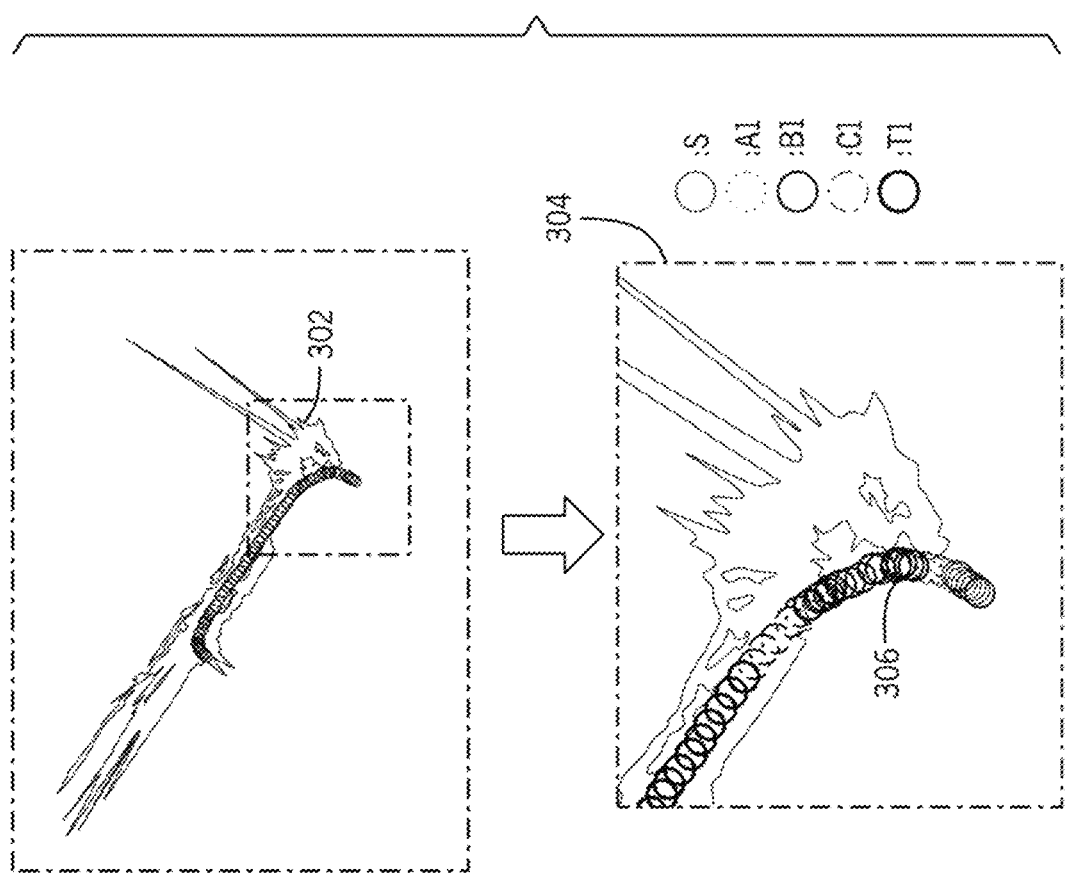
FIG. 3 is an illustrative example of road topology risk object point cloud according to an exemplary embodiment of the present disclosure.
Figure 3:
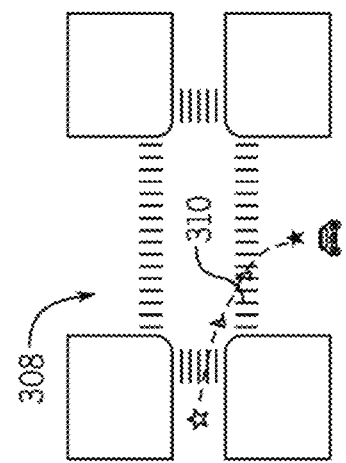

In one embodiment, upon determining the point cloud projection 206 that is based on the one or more monocular images of the surrounding environment of the ego vehicle 102, the neural network 110 may be configured to reconstruct the point cloud projection 206 by three-dimensionally rotating the point cloud projection 206. With reference to FIG. 3, the neural network 110 may complete XoZ projection of the point cloud projection 206 to rotate the image into a rotated XoZ point cloud plane projection 302.

In one configuration, the rotated XoZ point cloud plane projection 302 may be indicative of a birds-eye view of the surrounding environment of the ego vehicle 102 and may be shown in various color projections with respect to the rotated point cloud to include corresponding semantic meanings that are associated with respective features of the surrounding environment. For example, respective color projections may indicate buildings, crosswalks, sidewalks, lane markings, and the like. In one embodiment, the neural network 110 may be configured to analyze the rotated XoZ point cloud plane projection 302 to determine redundant object categories that do not directly influence the road topology. For example, points associated with buildings, trees, street lamps, road signs, and the like that are not directly located within the road topology and that do not directly affect the path of the ego vehicle 102 may be determined. Upon determining the redundant object categories, the neural network 110 may be configured to remove the points from the rotated XoZ point cloud plane projection 302 that correspond to the redundant object categories.

In one embodiment, upon removal of the points that correspond with the redundant object categories from the rotated XoZ point cloud plane projection 302, the neural network 110 may output a road topology risk object point cloud 304. The road topology risk object point cloud 304 may include a path projection 306 that corresponds to the travel path of the ego vehicle 102 within the surrounding environment of the ego vehicle 102. As shown in FIG. 3, if the path of the ego vehicle 102 is a left turn within an intersection 308 that is included within the surrounding environment of the ego vehicle 102, the perspective path 310 may be included as the path projection 306 upon the road topology risk object point cloud 304. This functionality may allow a pulse of the images being captured by the one or more monocular cameras 120 to determine a travel path of the ego vehicle 102. For example, numerous monocular images may be aggregated to determine a travel path of the ego vehicle 102 as a left turn within the intersection 308. In one configuration, the path of the ego vehicle 102 may be segmented into sections that may be associated with specific locations of the intersection 308 and the pose of the one or more monocular cameras 120 may be based on the travel path of the ego vehicle 102 through the locations of the intersection 308. These locations that are segmented into sections may include particular features such as crosswalks, lane markings, and the like that may be captured within the monocular images.

Stated differently, the road topology risk object point cloud 304 may enable the mapping of the path of the ego vehicle 102 through regions of the intersection 308 to thereby branch out the trajectory of the ego vehicle 102 with respect to locations of the intersection 308 throughout the path of the ego vehicle 102 through the intersection 308. As discussed below, upon outputting the road topology risk object point cloud 304, the neural network 110 may be configured to utilize the waypoint classifier 112 to complete semantic waypoint labeling of a plurality of semantic regions that may pertain to one or more waypoints that may be utilized as possible regions at which the ego vehicle 102 may travel to reach a particular location (e.g., that are included within the travel path of the ego vehicle 102). It is appreciated that the neural network 110 may output additional road topology risk object point clouds that may pertain to a plurality of paths of the ego vehicle 102. For example, additional road topology risk object point clouds (not shown) may be output that pertain to a straight travel path of the ego vehicle 102 through the intersection 308 and/or a right turn travel path of the ego vehicle 102 through the intersection 308.

Figure 4A:
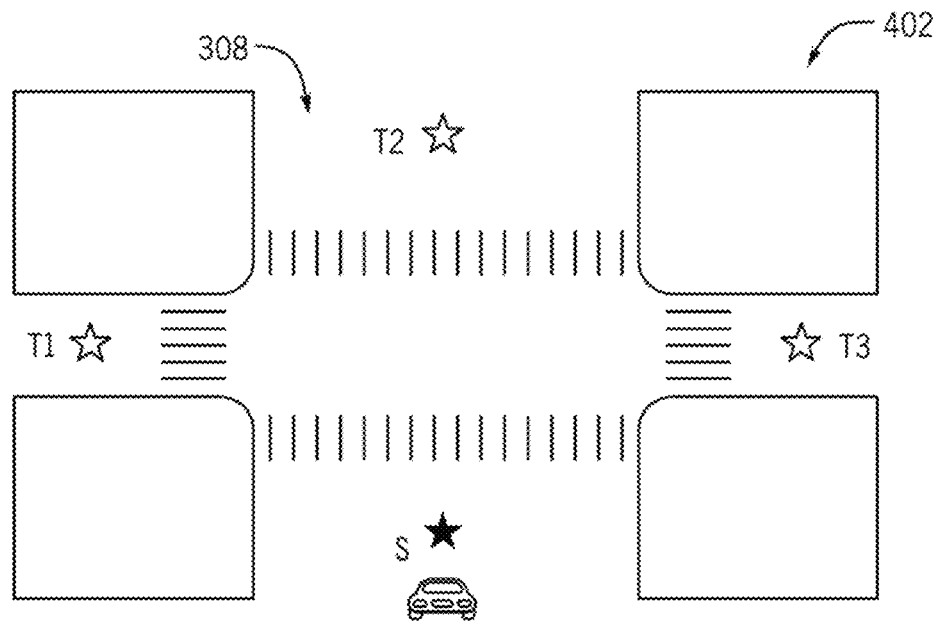
FIG. 4A is an illustrative a non-limiting example of a semantic classification of the road topology of the surrounding environment of the ego vehicle according to an exemplary embodiment of the present disclosure.

FIG. 4A illustrates an illustrative non-limiting example of a semantic classification of the road topology of the surrounding environment of the ego vehicle 102 according to an exemplary embodiment of the present disclosure. In one configuration, the risk object identification application 106 may be configured to utilize the neural network 110 to analyze one or more road topology risk object point clouds to output a roadway topology template of the surrounding environment of the ego vehicle 102. For example, the risk object identification application 106 may be configured to utilize the neural network 110 to analyze the road topology risk object point cloud 304 in addition to additional road topology risk object point clouds associated with alternative travel paths of the ego vehicle 102.

The roadway topology template may be based on the analysis of the image data associated with the one or more road topology risk object point clouds against a pre-trained road topology dataset that may be utilized by the waypoint classifier 112 of the neural network 110. The roadway topology template may include a classification of the roadways of the surrounding environment of the ego vehicle 102 and features of the roadways of the surrounding environment of the ego vehicle 102 that are included within the road topology risk object point cloud 304. For example, the roadway topology template may include a classification of the roadways as a four-way intersection and features that may include corners, crosswalks, lanes, etc., as included within the road topology risk object point cloud 304.

As shown in FIG. 4A, in one configuration, the neural network 110 may initially output the roadway topology template as a goal-based roadway topology template 402 that includes high level semantics of the road topology of the surrounding environment of the ego vehicle 102. The goal-based roadway topology template 402 may be initially output with four semantic goal regions. The four semantic goal regions may include, but may not be limited to, a current region in which the ego vehicle 102 is located/traveling (shown as S) and one or more semantic goal regions that may indicate locations that may serve as goals or waypoints that the path of the ego vehicle 102 may cross based on the direction of the travel path of the ego vehicle 102. As shown, in the non-limiting illustrative example of FIG. 4A, three semantic goal regions (shown as T1, T2, T3) may be included at three respective locations of the goal-based roadway topology template 402 that indicate goals that are based on the direction of travel (e.g., left turn, straight, right turn) of the ego vehicle 102 at the (four-way) intersection 308. In other words, the semantic goal regions may be reached based on the travel path of the ego vehicle 102 through the intersection 308.

Figure 4B:
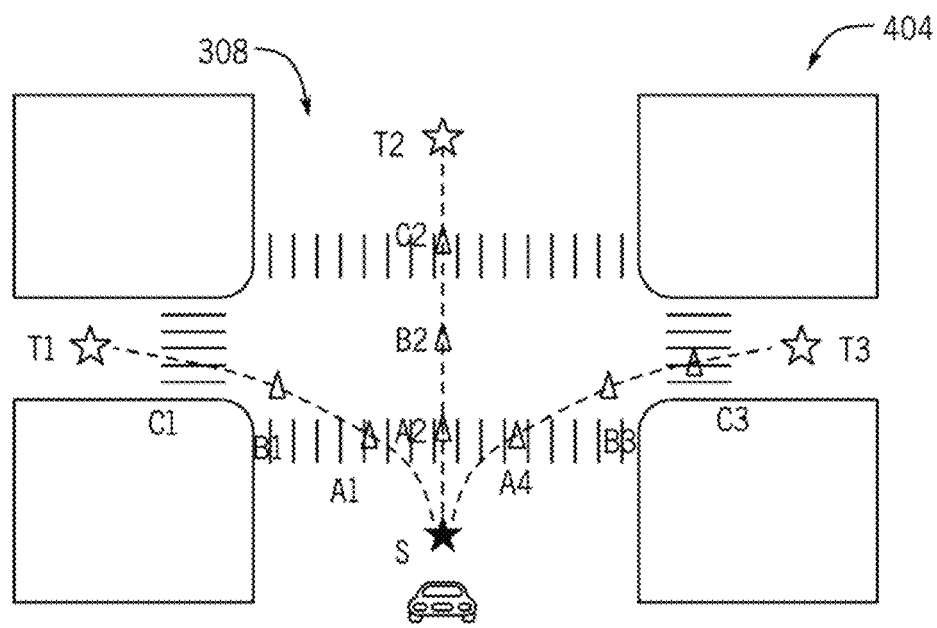
FIG. 4B is an illustrative example of a semantic waypoint labeling of semantic regions of the surrounding environment of the ego vehicle according to an exemplary embodiment of the present disclosure.

In one embodiment, upon outputting the high level semantics of the road topology of the surrounding environment of the ego vehicle 102, the risk object identification application 106 may be configured to complete further semantic segmentation of the roadway topology template. As shown in FIG. 4B, an illustrative example of a semantic waypoint labeling of semantic regions, the neural network 110 may be configured to further modify the roadway topology template of the surrounding environment of the ego vehicle 102 into a segmented semantic roadway topology template 404. In particular, the goal-based roadway topology template 402 maybe further segmented into a plurality of semantic regions that are indicated by semantic waypoint labeling and output as the segmented semantic roadway topology template 404.

In one or more embodiments, the neural network 110 may be configured to utilize the waypoint classifier 112 to segment the roadway topology template into a plurality of segmented regions and may classify the segmented regions based on semantic waypoint labeling. As discussed above, the plurality of semantic regions may pertain to one or more waypoints that may be utilized as possible regions at which the ego vehicle 102 may travel to reach a particular location (e.g., goal, destination). Accordingly, the risk object identification application 106 may communicate with the neural network 110 to output the segmented semantic roadway topology template 404.

In one embodiment, the risk object identification application 106 may track one or more paths of the ego vehicle 102 through one or more semantic regions and may output a plurality of semantic waypoint labels (shown as A1, A2, A3, B1, B2, B3, C1, C2, C3) that may be associated with the predicted or tracked path of the ego vehicle 102. Accordingly, the segmented semantic roadway topology template 404 may be outputted with the plurality of semantic waypoint labels that may indicate the plurality of semantic regions that the ego vehicle 102 may be located at as the ego vehicle 102 is driven using a particular travel path through the intersection 308.

As an illustrative example, as discussed above with respect to FIG. 3, if the path of the ego vehicle 102 is a left turn within the intersection 308 that is included within the surrounding environment of the ego vehicle 102, the perspective path 310 may be included as the path projection 306 upon the road topology risk object point cloud 304. With reference again to FIG. 4B, the risk object identification application 106 may track one or more paths of the ego vehicle 102 through one or more semantic regions that are included with the left turn path and may output a plurality of semantic waypoint labels that may include S as a starting point of the path, A1 as a region of a cross walk that the path crosses, B1 as a region of the intersection 308 that the path crosses, C1 as a region of another crosswalk that the path crosses, and T1 as a semantic goal region that the path of the ego vehicle 102 crosses. It is appreciated that the risk object identification application 106 may track one or more paths of the ego vehicle 102 through one or more alternate semantic regions (e.g., in an alternate left turn travel path scenario with an alternate left turn travel path, in a right turn travel path scenario, in a straightforward travel path scenario) that may capture the pose of the one or more monocular cameras 120 based on various turning angles that may be utilized by the ego vehicle 102 to make the left turn.

In an exemplary embodiment, upon tracking one or more paths of the ego vehicle 102 through one or more semantic regions and outputting a plurality of semantic waypoint labels associated with the path of the ego vehicle 102, the risk object identification application 106 may be configured to access the storage unit 108 to retrieve counterfactual data from a counterfactual dataset 116 stored upon the storage unit 108. In an exemplary embodiment, the counterfactual dataset 116 may be pre-trained with object profiles that may be associated with a plurality of static objects and a plurality of dynamic objects. The object profiles may be classified based on a variety of types of static objects and a variety of types of dynamic objects. For example, the objects profiles may classified as road side static objects, man-made static objects, traffic related static objects, natural static objects, and the like. Additionally, the object profiles may be classified as dynamic objects such as pedestrians, cars, trucks, buses, bicycles, and the like.

In one embodiment, the risk object identification application 106 may access the counterfactual dataset 116 to retrieve one or more object profiles to thereby inpaint one or more one or more static objects and/or one or more dynamic objects that may occur at various semantic regions that are within the travel path of the ego vehicle 102 at pixels within the one or more monocular images that include the at one or more of the semantic regions that are within the path of the ego vehicle 102. As shown in an illustrative example of FIG. 5, for a left turn scenario (that corresponds to the scenario described above with respect to the path projection 306 upon the road topology risk object point cloud 304), the neural network 110 may be configured to access the counterfactual dataset 116 to retrieve one or more object profiles that may be associated with one or more respective dynamic objects and/or static objects. The risk object identification application 106 may be configured to inpaint the one or more dynamic objects and/or the one or more static objects at one or more of the semantic regions that are within the path of the ego vehicle 102. As shown, in a left turn scenario 502, the neural network 110 may be configured to augment a crossing pedestrian 504 to be inpainted into a left turn driving scene 506 that occurs at the intersection 308. Similarly, in a right turn scenario 508, the neural network 110 may be configured to augment a crossing vehicle 510 to be inpainted into a right turn driving scene 512 that occurs at the intersection 308.

In one embodiment, upon determining the road topology and completing counterfactual augmentation with respect to one or more semantic regions of the surrounding environment of the ego vehicle 102, the risk object identification application 106 may be configured to utilize the neural network 110 to determine one or more driver intentions and/or one or more driver responses. In one configuration, the neural network 110 may access the intention classifier 114 to analyze the road topology of one or more roadways and a counterfactual augmentation of one or more objects against the pre-trained dataset to utilize pre-trained historical data and future observations with respect to future semantic regions associated with the path of the ego vehicle 102 to determine the driver's intention and driver's response.

The intention classifier 114 may be configured to utilize pre-trained past observations of the driver's intention and driver's response to similar road topology and the inclusion of one or more types of dynamic objects and/or static objects within one or more driving poses to analyze a past feature that includes a prior pose of the ego vehicle 102 and a current feature that includes a current driving scene. The intention classifier 114 may be configured to output a future feature that will be aggregated with the current feature to output a subsequent future feature. Accordingly, the intention classifier 114 may enable the neural network 110 to determine one or more driver intentions and/or one or more driver responses at one or more future points (t+1, t+2, t+3, t+n) in time that may be influenced by the road topology and the inclusion of one or more augmented objects within the pathway of the ego vehicle 102.

Referring again to FIG. 1, upon the execution of road topology modeling and counterfactual scenario generation, the ego vehicle 102 may be operably controlled by the risk object identification application 106 to provide warnings and/or autonomously operate based on determined driver intentions and/or driver responses. In one embodiment, the risk object identification application 106 may evaluate the driver intentions and/or driver responses to determine one or more command instructions to operate the ego vehicle 102 in a manner that accounts for the driver intentions and/or driver responses based on the road topology or the inclusion of one or more objects with respect to the path of the ego vehicle 102 at one or more future time steps.

In one configuration, the one or more command instructions may be communicated to a vehicle controller 122 of the ego vehicle 102 to autonomously control the ego vehicle 102 to account for the driver intentions and/or driver responses at one or more future time steps. In particular, the one or more command instructions may be communicated to operably control the vehicle controller 122 to process and execute autonomous dynamic parameters based on a perspective travel path (e.g., left turn) of the ego vehicle 102, one or more static objects that may be located within or near the travel path, and/or one or more dynamic objects that may be located and/or may appear within or near the travel path of the ego vehicle 102.

The vehicle controller 122 may be configured to execute autonomous driving commands to operate the ego vehicle 102 to be fully autonomously driven or semi-autonomously driven in a particular manner to accommodate the driver intentions and/or driver responses. The vehicle controller 122 may be configured to autonomously control the ego vehicle 102 to operate in a manner based on the one or more executable command instructions that are output by the risk object identification application 106. For example, the application 106 may send commands to the vehicle controller 122 to ensure that the ego vehicle 102 is autonomously operated to complete smooth acceleration, braking, and/or steering to smoothly navigate within the surrounding environment of the ego vehicle 102 to accommodate the driver intentions and/or driver responses.

In one or more embodiments, the vehicle controller 122 may autonomously control the operation of the ego vehicle 102 by providing one or more commands to one or more vehicle systems/control units 124 to provide full autonomous or semi-autonomous control of the ego vehicle 102. Such autonomous control of the ego vehicle 102 may be provided by sending one or more commands to control one or more of the vehicle systems/control units 124 to operate (e.g., drive) the ego vehicle 102 during one or more circumstances (e.g., when providing driver assist controls), and/or to fully control driving of the ego vehicle 102 during an entire trip of the ego vehicle 102.

In some configurations, the vehicle systems/control units 124 may include driver assistance systems that may provide audio and/or visual alerts to the driver of the ego vehicle 102 in one or more circumstances. In one embodiment, the risk object identification application 106 may evaluate the driver intentions and/or driver responses to determine one or more command instructions to be outputted to the vehicle systems/control units 124 to provide one or more alerts to the driver of the ego vehicle 102 that may be based on the determined driver intentions and/or driver responses.

In an exemplary embodiment, the storage unit 108 of the ego vehicle 102 may additionally store a risk object dataset 126. In one embodiment, upon accessing the intention classifier to determine one or more driver intentions and/or one or more driver responses, the risk object identification application 106 may receive the determined driver intentions and/or driver responses. The risk object identification application 106 may thereby access the risk object dataset 126 to populate the dataset with information associated with the road topology and one or more counterfactual augmentations that may be associated with specific semantic waypoint labels that correspond to semantic regions. In some configurations, such data may be utilized to further train the neural network 110 that may enable the intention classifier 114 to use past determinations for future driver intention and/or driver response determinations in similar environments (e.g., that includes a similar road topology) to the current surrounding environment of the ego vehicle 102.

In some embodiments, the risk object identification application 106 may access and analyze the risk object dataset 126 to provide motion planning capabilities while executing autonomous driving commands that may be provided to autonomously control the ego vehicle 102 in various traffic environments that may be similar (e.g., in one or more manners) to the surrounding environment of the ego vehicle 102 to preemptively adapt to likely driver intentions and/or driver responses.

II. The Risk Object Identification Application and Related Methods

Components of the risk object identification application 106 now be described according to an exemplary embodiment and with reference to FIG. 1. In an exemplary embodiment, the risk object identification application 106 may be stored on the storage unit 108 and executed by the ECU 104 of the ego vehicle 102. In another embodiment, the risk object identification application 106 may be stored on an externally hosted computing infrastructure (not shown) and may be accessed by a telematics control unit (not shown) of the ego vehicle 102 to be executed by the ECU 104 of the ego vehicle 102.

With continued reference to FIG. 1, the general functionality of the risk object identification application 106 will now be discussed. In an exemplary embodiment, the risk object identification application 106 may include a plurality of modules 128-134 that may be configured to communicate with the neural network 110 to complete risk object identification that pertains to the operation of the ego vehicle 102.

In one or more embodiments, the plurality of modules 128-134 of the risk object identification application 106 may include a data reception module 128, a semantic labeling module 130, a counterfactual augmentation module 132, and a vehicle control module 134. However, it is appreciated that the risk object identification application 106 may include one or more additional modules and/or sub-modules that are included in lieu of the modules 128-134.

Figure 5:
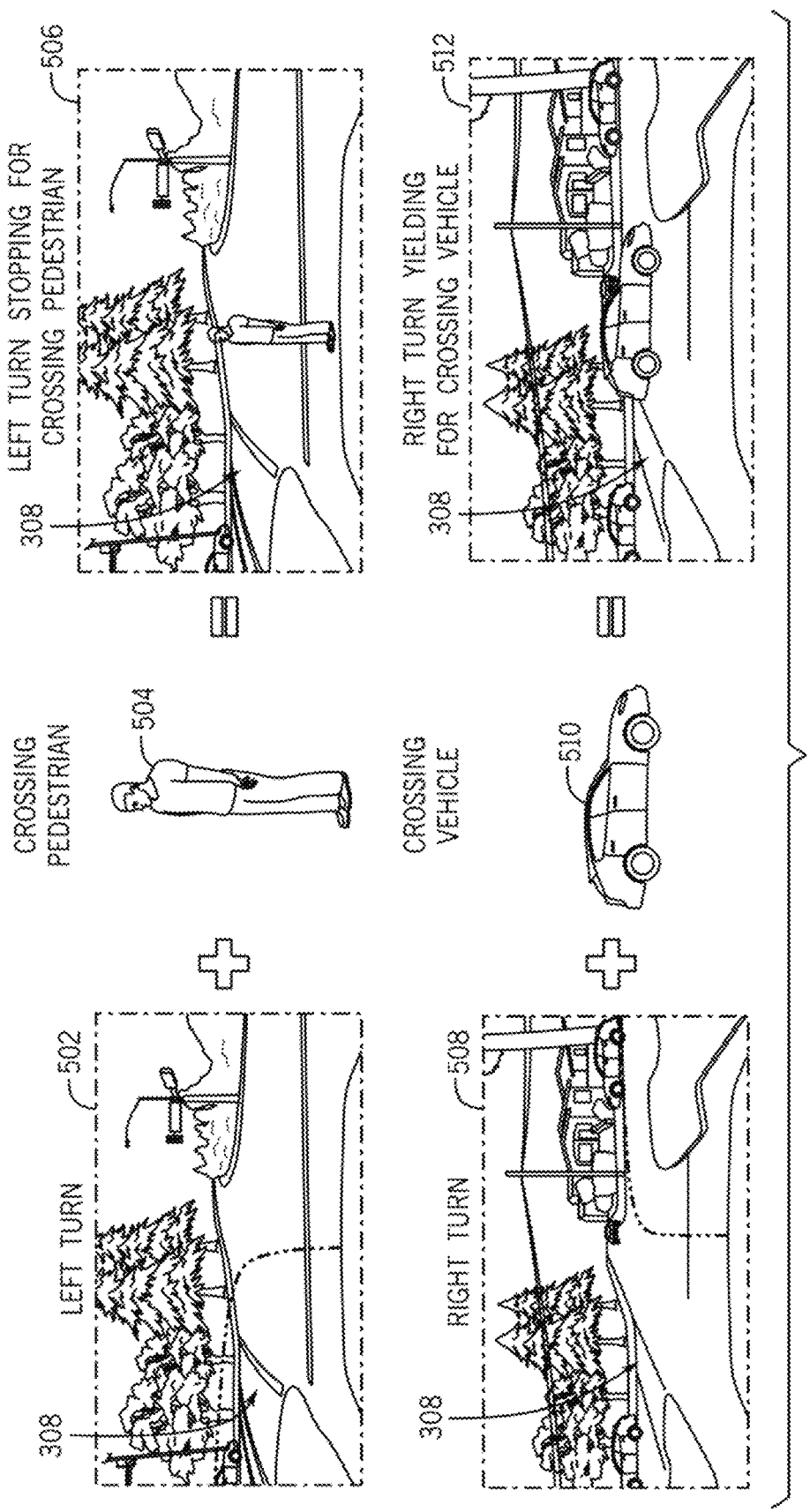
FIG. 5 is an illustrative example of counterfactual augmentation with respect to the semantic regions of the surrounding environment of the ego vehicle according to an exemplary embodiment of the present disclosure.
Figure 6:
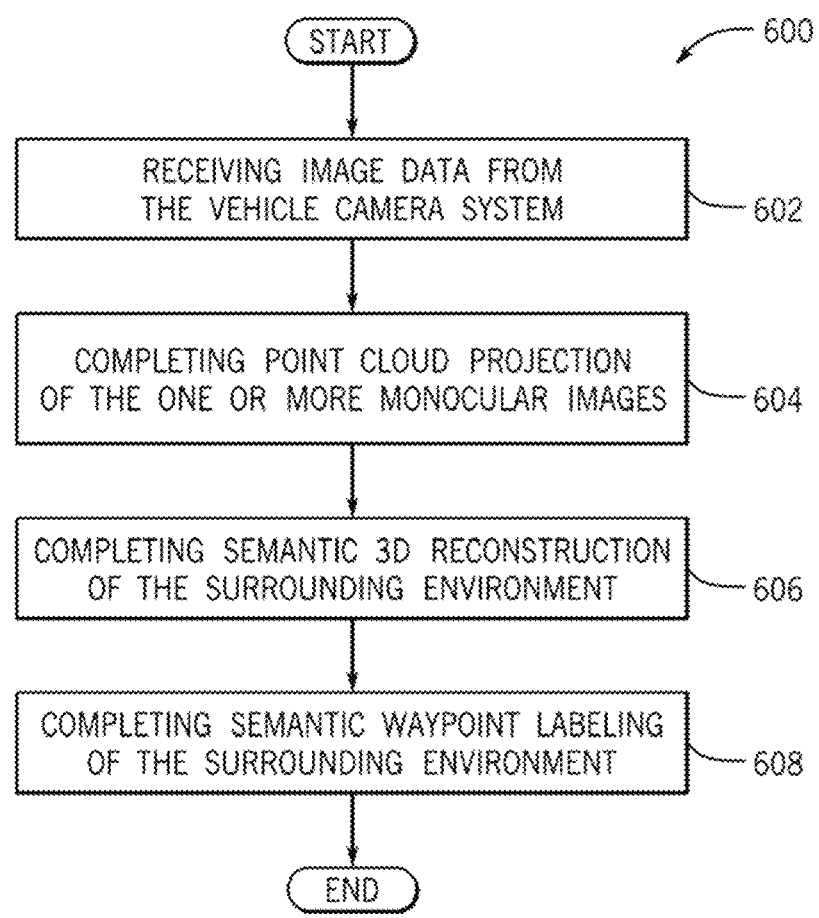
FIG. 6 is a process flow diagram of a method for completing semantic waypoint labeling of the surrounding environment of the ego vehicle according to an exemplary embodiment of the present disclosure.

FIG. 6 is a process flow diagram of a method 600 for completing semantic waypoint labeling of the surrounding environment of the ego vehicle 102 according to an exemplary embodiment of the present disclosure. FIG. 6 will be described with reference to the components of FIG. 1-FIG. 5 though it is to be appreciated that the method 600 of FIG. 6 may be used with other systems/components. The method 600 may begin at block 602, wherein the method 600 may include receiving image data from the vehicle camera system 118.

In an exemplary embodiment, the data reception module 128 of the risk object identification application 106 may be configured to receive image data that may be associated with one or more monocular images that have been captured by the one or more monocular cameras 120 of the vehicle camera system 118. Based on the monocular images captured by the one or more monocular cameras 120, the vehicle camera system 118 may be configured to analyze the monocular images to detect objects, detect road markings, and track objects that are located within the surrounding environment of the ego vehicle 102. The vehicle camera system 118 may be configured to package the detections into image data that is communicated to the data reception module 128 of the risk object identification application 106.

The method 600 may proceed to block 604, wherein the method 600 may include completing point cloud projection of the one or more monocular images. In an exemplary embodiment, upon receiving the image data associated with one or more monocular images of the surrounding environment of the ego vehicle 102, the data reception module 128 may communicate respective data to the semantic labeling module 130 of the risk object identification application 106.

In one embodiment, the semantic labeling module 130 may be configured to execute image logic to process a structure from motion three dimensional reconstruction of the one or more monocular images. In one configuration, image data may be analyzed to determine roadway topology and features of the surrounding environment (e.g., cross walks, traffic lights). Such features may be shown in corresponding RGB colors 204 that are configured to provide rich information about object appearance, as well as relationships and interactions between objects and the surrounding environment.

In an exemplary embodiment, the semantic labeling module 130 may communicate with the neural network 110 to analyze the RGB colors 204 that are configured to provide rich information about object appearance to determine a point cloud projection 206 associated with the surrounding environment of the ego vehicle 102. As discussed above, the point cloud projection 206 may include a plurality of points that represent a 3D shape or object that each include a set of X, Y, and Z coordinates that may be associated with various features of the surrounding environment of the ego vehicle 102. For example, the point cloud projection 206 may include a plurality of points that represent buildings, traffic lights, cross walks, lane markings, road signs, sidewalks, and the like.

With continued reference to the method 600 of FIG. 6, the method 600 may proceed to block 606, wherein the method 600 may include completing semantic 3D reconstruction of the surrounding environment. In an exemplary embodiment, upon the neural network 110 determining the point cloud projection 206 that is based on the one or more monocular images of the surrounding environment of the ego vehicle 102, the semantic labeling module 130 may utilize the neural network 110 to completing semantic 3D construction of the surrounding environment of the ego vehicle 102.

In one configuration, the neural network 110 may be configured to reconstruct the point cloud projection 206 by three-dimensionally rotating the point cloud projection 206. The neural network 110 may complete XoZ projection of the point cloud projection 206 to rotate the image into a rotated XoZ point cloud plane projection 302 that may be indicative of a birds-eye view of the surrounding environment of the ego vehicle 102. The rotated XoZ point cloud plane projection 302 may be processed in various color projections with respect to the rotated point cloud to include corresponding semantic meanings that are associated with respective features of the surrounding environment.

In an exemplary embodiment, the neural network 110 may be configured to analyze the rotated XoZ point cloud plane projection 302 to determine redundant object categories that do not directly influence the road topology. The neural network 110 may be configured to remove the points from the rotated XoZ point cloud plane projection 302 that correspond to the redundant object categories and may output a road topology risk object point cloud 304. The road topology risk object point cloud 304 may include a path projection 306 that corresponds to the travel path of the ego vehicle 102 within the surrounding environment of the ego vehicle 102.

With continued reference to the method 600 of FIG. 6, the method 600 may proceed to block 608, wherein the method 600 may include completing semantic waypoint labeling of the surrounding environment. In an exemplary embodiment, upon completion of the 3D construction of the surrounding environment of the ego vehicle 102, the neural network 110 may be configured to access the waypoint classifier 112 to complete semantic waypoint labeling of the surrounding environment. In particular, the neural network 110 may be configured to utilize the waypoint classifier 112 to complete semantic waypoint labeling of a plurality of semantic regions that may pertain to one or more waypoints that may be utilized as possible regions at which the ego vehicle 102 may travel to reach a particular location (e.g., that are included within the travel path of the ego vehicle 102).

In one embodiment, the neural network 110 may initially output the roadway topology template as a goal-based roadway topology template 402 that includes high level semantics of the road topology of the surrounding environment of the ego vehicle 102. The goal-based roadway topology template 402 may be initially output with an n number of semantic goal regions that may include a current region in which the ego vehicle 102 is located/traveling and one or more semantic goal regions that may indicate locations that may serve as goals or waypoints that the path of the ego vehicle 102 may cross based on the direction of the travel path of the ego vehicle 102. For example, as shown in FIG. 4A, the three semantic goal regions (shown as T1, T2, T3) may be included at three respective locations of the goal-based roadway topology template 402 that indicate goals that are based on the direction of travel (e.g., left turn, straight, right turn) of the ego vehicle 102 that is located at a current region (S) of the intersection 308.

In one or more embodiments, upon outputting the high level semantics of the road topology of the surrounding environment of the ego vehicle 102, the neural network 110 may be configured to further modify the roadway topology template of the surrounding environment of the ego vehicle 102 into the segmented semantic roadway topology template 404. In particular, the goal-based roadway topology template 402 maybe further segmented into a plurality of semantic regions that are indicated by semantic waypoint labeling and output as the segmented semantic roadway topology template 404. The neural network 110 may be configured to utilize the waypoint classifier 112 to segment the roadway topology template into a plurality of segmented regions and may classify the segmented regions based on semantic waypoint labeling. The neural network 110 may thereby output the segmented semantic roadway topology template 404 in one or more electronic data formats to the semantic labeling module 130.

In one embodiment, the semantic labeling module 130 may track one or more paths of the ego vehicle 102 through one or more semantic regions and may output a plurality of semantic waypoint labels (shown as A1, A2, A3, B1, B2, B3, C1, C2, C3 in FIG. 4B) that may be associated with the predicted or tracked path of the ego vehicle 102. Accordingly, the segmented semantic roadway topology template 404 may be processed by the semantic labeling module 130 with the plurality of semantic waypoint labels that may indicate the plurality of semantic regions that the ego vehicle 102 may be located at as the ego vehicle 102 is driven using a particular travel path through the intersection 308.

Figure 7:
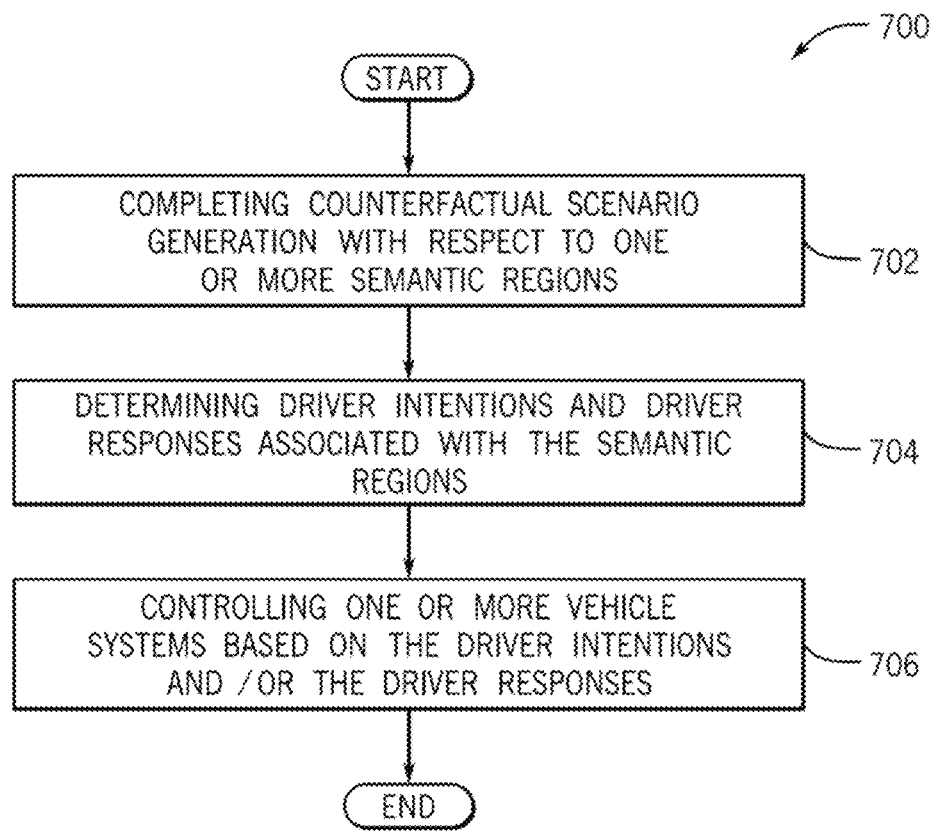
FIG. 7 is a process flow diagram of a method for completing counterfactual scenario generation and determining driver intentions and driver responses with respect to the semantic regions of the surrounding environment of the ego vehicle according to an exemplary embodiment of the present disclosure.

FIG. 7 is a process flow diagram of a method 700 for completing counterfactual scenario generation and determining driver intentions and driver responses with respect to the semantic regions of the surrounding environment of the ego vehicle 102 according to an exemplary embodiment of the present disclosure. FIG. 7 will be described with reference to the components of FIG. 1-FIG. 5 though it is to be appreciated that the method 700 of FIG. 7 may be used with other systems/components. The method 700 may begin at block 702, wherein the method 700 may include completing counterfactual scenario generation with respect to one or more semantic regions.

In an exemplary embodiment, upon determining and outputting the plurality of semantic waypoint labels associated with the plurality of semantic regions, the semantic labeling module 130 may communicate data pertaining to the plurality of semantic regions of the surrounding environment of the ego vehicle 102 to the counterfactual augmentation module 132 of the risk object identification application 106. The counterfactual augmentation module 132 may be configured to complete counterfactual augmentation with respect to one or more semantic regions of the surrounding environment of the ego vehicle 102. In particular, counterfactual augmentation module 132 may be configured to access the storage unit 108 to retrieve counterfactual data from the counterfactual dataset 116 stored upon the storage unit 108. As discussed above, the counterfactual dataset 116 may be pre-trained with object profiles that may be classified based on a variety of types of static objects and a variety of types of dynamic objects.

In one embodiment, the counterfactual augmentation module 132 may access the counterfactual dataset 116 to retrieve one or more object profiles to thereby inpaint one or more one or more static objects and/or one or more dynamic objects that may occur at various semantic regions that are within the travel path of the ego vehicle 102 in one or more manners. In one configuration, the counterfactual augmentation module 132 may be configured to inpaint the one or more dynamic objects and/or the one or more static objects at pixels within the one or more monocular images that include one or more of the semantic regions that are within the path of the ego vehicle 102.

As an illustrative example, with reference to FIG. 4B and FIG. 5, a semantic region labeled as A1 may be inpainted with a crossing pedestrian 504 for a specific left turn travel path of the ego vehicle 102. Similarly, a semantic region labeled as A3 may be inpainted with a crossing vehicle 510 for a specific right turn travel path of the ego vehicle 102. Static objects and/or dynamic objects may be inpainted in one or more semantic regions at an N camera post. Accordingly, inpainting may occur at one or more different camera frames that capture one or more different camera poses of the ego vehicle 102 traveling through a specific travel path to its goal.

Referring again to the method 700 of FIG. 7, the method 700 may proceed to block 704, wherein the method 700 may include determining driver intentions and driver responses associated with the semantic regions. In one embodiment, upon completing counterfactual augmentation with respect to one or more semantic regions of the surrounding environment of the ego vehicle 102, the counterfactual augmentation module 132 may be configured to utilize the neural network 110 to determine one or more driver intentions and/or one or more driver responses. In one configuration, the neural network 110 may access the intention classifier 114 to analyze the road topology of one or more roadways and the counterfactual augmentation of one or more objects against the pre-trained dataset to utilize pre-trained historical data and future observations with respect to future semantic regions associated with the path of the ego vehicle 102 to determine the driver's intention and driver's response.

The intention classifier 114 may be configured to utilize pre-trained past observations of the driver's intention and driver's response to similar road topology and the inclusion of one or more types of dynamic objects and/or static objects within one or more driving poses to analyze a past feature that includes a prior pose of the ego vehicle 102 and a current feature that includes a current driving scene. The intention classifier 114 may be configured to output a future feature that will be aggregated with the current feature to output a subsequent future feature. Accordingly, the intention classifier 114 may enable the neural network 110 to determine one or more driver intentions and/or one or more driver responses at one or more future points in time that may be influenced by the road topology and the inclusion of one or more augmented objects within the pathway of the ego vehicle 102.

In one configuration, a first feature may include an observation from the past. A second feature taken into account may include a future feature that may pertain to a predicted travel path of the ego vehicle 102 and the observations and poses that may be determined at one or more semantic regions. In one embodiment the first feature and the future features may be analyzed as training signals to form a subsequent future feature which may be utilized to determine the intention of the driver of the ego vehicle 102 with respect to the future travel path of the ego vehicle 102. It is appreciated that each future feature may be analyzed with the current feature to then to generate another subsequent future feature with respect to the driver's intention that is associated with the travel path of the ego vehicle 102.

With respect to the one or more driver responses, potential driver responses may be determined based on the inpainting of one or more dynamic objects and/or one or more static objects. In particular, the reaction of the driver may be perceived as to whether the driver may stop, slow down, and/or change the travel path of the ego vehicle 102 based on the inclusion of one or more dynamic objects and/or one or more static objects within one or more semantic regions that may be included within a potential travel path of the ego vehicle 102.

In particular, an observation from the past may be analyzed and a second feature that may include counterfactual augmentation of one or more objects may be taken into account with respect to a predicted travel path of the ego vehicle 102 and the observations and poses that may be determined at one or more semantic regions. In one embodiment the first feature and the future features may be analyzed with respect to the counterfactual augmentation as training signals to form a subsequent future feature which may be utilized to determine the response the driver of the ego vehicle 102 with respect to the future travel path of the ego vehicle 102. In one embodiment, upon outputting driver intentions and/or driver responses that are associated with the semantic regions, the neural network 110 may communicate data pertaining to the driver intentions and/or driver responses to the counterfactual augmentation module 132.

With continued reference to the method 700 of FIG. 7, the method 700 may proceed to block 706, wherein the method 700 may include controlling one or more vehicle systems based on the driver intentions and/or the driver responses. In an exemplary embodiment, the counterfactual augmentation module 132 may be configured to communicate data pertaining to the driver intentions and/or driver responses as output by the neural network 110 to the vehicle control module 134 of the risk object identification application 106. In one embodiment, the vehicle control module 134 may be configured to evaluate the driver intentions and/or driver responses to determine one or more command instructions to operate the ego vehicle 102 in a manner that accounts for the driver intentions and/or driver responses based on the road topology or the inclusion of one or more objects with respect to the path of the ego vehicle 102 at one or more future time steps.

The vehicle control module 134 may be configured to communicate one or more command instructions to the vehicle controller 122 of the ego vehicle 102 to autonomously control the ego vehicle 102 to account for the driver intentions and/or driver responses at one or more future time steps. In particular, the one or more command instructions may be output and communicated by the vehicle control module 134 to operably control the vehicle controller 122 to process and execute autonomous dynamic parameters based on a perspective travel path (e.g., left turn) of the ego vehicle 102, one or more static objects that may be located within or near the travel path, and/or one or more dynamic objects that may be located and/or may appear within or near the travel path of the ego vehicle 102.

The vehicle controller 122 may be configured to execute autonomous driving commands to operate the ego vehicle 102 to be fully autonomously driven or semi-autonomously driven in a particular manner to accommodate the driver intentions and/or driver responses. In particular, the vehicle controller 122 may autonomously control the operation of the ego vehicle 102 by providing one or more commands to one or more vehicle systems/control units 124 to provide full autonomous or semi-autonomous control of the ego vehicle 102. Such autonomous control of the ego vehicle 102 may be provided by sending one or more commands to control one or more of the vehicle systems/control units 124 to operate (e.g., drive) the ego vehicle 102 during one or more circumstances (e.g., when providing driver assist controls), and/or to fully control driving of the ego vehicle 102 during an entire trip of the ego vehicle 102.

In some embodiments, the vehicle control module 134 may be configured to evaluate the driver intentions and/or driver responses to determine one or more command instructions to the vehicle systems/control units 124 to provide one or more alerts to the driver of the ego vehicle 102 that may be based on the determined driver intentions and/or driver responses to ensure that the ego vehicle 102 is autonomously operated to complete smooth acceleration, braking, and/or steering to smoothly navigate within the surrounding environment of the ego vehicle 102.

Figure 8:
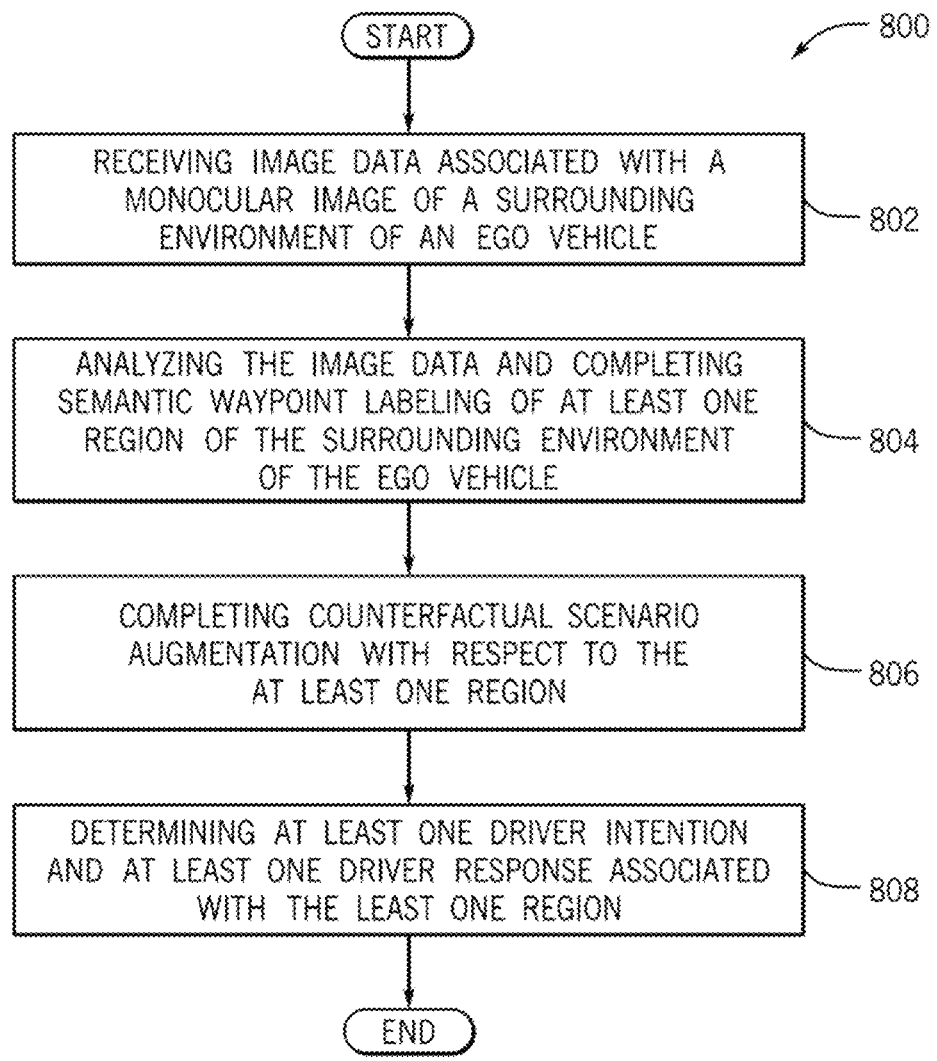
FIG. 8 is a process flow diagram of a method for completing risk object identification according to an exemplary embodiment of the present disclosure.

FIG. 8 is a process flow diagram of a method 800 for completing risk object identification according to an exemplary embodiment of the present disclosure. FIG. 8 will be described with reference to the components of FIG. 1-FIG. 5 though it is to be appreciated that the method 800 of FIG. 8 may be used with other systems/components. The method 800 may begin at block 802, wherein the method 800 may include receiving image data associated with a monocular image of a surrounding environment of an ego vehicle 102.

The method 800 may proceed to block 804, wherein the method 800 may include analyzing the image data and completing semantic waypoint labeling of at least one region of the surrounding environment of the ego vehicle 102. The method 800 may proceed to block 806, wherein the method 800 may include completing counterfactual scenario augmentation with respect to the at least one region. In one embodiment, the counterfactual scenario augmentation includes an augmentation of an object at the at least one region. The method 800 may proceed to block 808, wherein the method 800 may include determining at least one driver intention and at least one driver response associated with the at least one region. In one embodiment, at least one vehicle system is controlled based on at least one of: the at least one driver intention and the at least one driver response.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for completing risk object identification comprising:
   receiving image data associated with a monocular image of a surrounding environment of an ego vehicle;
   analyzing the image data and completing semantic waypoint labeling, of at least one region of the surrounding environment of the ego vehicle, to determine features of the surrounding environment and a path projection that corresponds to a travel path of the ego vehicle;
   receiving one or more object profiles associated with at least one of a dynamic object and a static object based on the features of the surrounding environment;
   completing counterfactual scenario augmentation, while the ego vehicle is travelling on the travel path and using a neural network, with respect to the at least one region by inpainting the at least one of the dynamic object and the static object at pixels within the travel path of the ego vehicle in the monocular image based on the one or more object profiles; and
   determining, in real time while the ego vehicle is travelling on the travel path, at least one driver intention and at least one driver response by the neural network augmented in real time with the counterfactual scenario augmentation of the at least one region, wherein at least one vehicle system is controlled based on at least one of: the at least one driver intention and the at least one driver response, and wherein the inpainted object is generated from a stored object associated with the one or more object profiles.

2. The computer-implemented method of claim 1, wherein the monocular image is analyzed to detect objects, detect road markings, and track objects that are located within the surrounding environment of the ego vehicle.

3. The computer-implemented method of claim 1, wherein analyzing the image data and completing the semantic waypoint labeling includes completing a point cloud projection of the monocular image, wherein the image data is analyzed to determine roadway topology and the features of the surrounding environment of the ego vehicle.

4. The computer-implemented method of claim 3, wherein the point cloud projection includes a plurality of points that are associated with the features of the surrounding environment, wherein the plurality of points represent a three-dimensional shape that includes a set of three-dimensional coordinates.

5. The computer-implemented method of claim 3, wherein analyzing the image data and completing the semantic waypoint labeling includes three-dimensionally rotating the point cloud projection into a XoZ point cloud plane projection, wherein the XoZ point cloud plane projection is indicative of a birds-eye view of the surrounding environment of the ego vehicle.

6. The computer-implemented method of claim 3, wherein analyzing the image data and completing the semantic waypoint labeling includes outputting a road topology risk object point cloud that includes the path projection that corresponds to the travel path of the ego vehicle within the surrounding environment of the ego vehicle.

7. The computer-implemented method of claim 6, wherein the path projection is analyzed by a neural network to complete semantic waypoint labeling of a plurality of regions of the travel path of the ego vehicle, wherein the semantic waypoint labeling includes labeling a current location of the ego vehicle and a plurality of regions of the surrounding environment of the ego vehicle that are included within the travel path of the ego vehicle.

8. The computer-implemented method of claim 1, wherein determining the at least one driver intention and the at least one driver response associated with the at least one region includes analyzing a road topology of at least one roadway of the surrounding environment of the ego vehicle and the counterfactual augmentation with respect to the at least one region against a pre-trained data set to utilize pre-trained historical data with predicted future observations associated with the travel path of the ego vehicle.

9. The computer-implemented method of claim 1, further comprising:

determining, based at least in part on the determined at least one driver intention and at least one driver response, an updated path projection that corresponds to the travel path of the ego vehicle.

10. A system for completing risk object identification comprising:

a memory storing instructions when executed by a processor cause the processor to:

receive image data associated with a monocular image of a surrounding environment of an ego vehicle;

analyze the image data and completing semantic waypoint labeling, of at least one region of the surrounding environment of the ego vehicle, to determine features of the surrounding environment and a path projection that corresponds to a travel path of the ego vehicle;

receive one or more object profiles associated with at least one of a dynamic object and a static object based on the features of the surrounding environment;

complete counterfactual scenario augmentation, while the ego vehicle is travelling on the travel path and using a neural network, with respect to the at least one region by inpainting the at least one of the dynamic object and the static object at pixels within the travel path of the ego vehicle in the monocular image based on the one or more object profiles; and determine, in real time while the ego vehicle is travelling on the travel path, at least one driver intention and at least one driver response by the neural network augmented in real time with the counterfactual scenario augmentation of the at least one region, wherein at least one vehicle system is controlled based on at least one of: the at least one driver intention and the at least one driver response, and wherein the inpainted object is generated from a stored object associated with the one or more object profiles.

11. The system of claim 10, wherein the monocular image is analyzed to detect objects, detect road markings, and track objects that are located within the surrounding environment of the ego vehicle.

12. The system of claim 10, wherein analyzing the image data and completing the semantic waypoint labeling includes completing a point cloud projection of the monocular image, wherein the image data is analyzed to determine roadway topology and the features of the surrounding environment of the ego vehicle.

13. The system of claim 12, wherein the point cloud projection includes a plurality of points that are associated with the features of the surrounding environment, wherein the plurality of points represent a three-dimensional shape that includes a set of three-dimensional coordinates.

14. The system of claim 12, wherein analyzing the image data and completing the semantic waypoint labeling includes three-dimensionally rotating the point cloud projection into a XoZ point cloud plane projection, wherein the XoZ point cloud plane projection is indicative of a birds-eye view of the surrounding environment of the ego vehicle.

15. The system of claim 12, wherein analyzing the image data and completing the semantic waypoint labeling includes outputting a road topology risk object point cloud that includes the path projection that corresponds to the travel path of the ego vehicle within the surrounding environment of the ego vehicle.

16. The system of claim 15, wherein the path projection is analyzed by a neural network to complete semantic waypoint labeling of a plurality of regions of the travel path of the ego vehicle, wherein the semantic waypoint labeling includes labeling a current location of the ego vehicle and a plurality of regions of the surrounding environment of the ego vehicle that are included within the travel path of the ego vehicle.

17. The system of claim 10, wherein determining the at least one driver intention and the at least one driver response associated with the at least one region includes analyzing a road topology of at least one roadway of the surrounding environment of the ego vehicle and the counterfactual augmentation with respect to the at least one region against a pre-trained data set to utilize pre-trained historical data with predicted future observations associated with the travel path of the ego vehicle.

18. The system of claim 10, wherein the path projection is updated based at least in part on the determined at least one driver intention and at least one driver response.

19. A non-transitory computer readable storage medium storing instructions that when executed by a computer, which includes a processor perform a method, the method comprising:

receiving image data associated with a monocular image of a surrounding environment of an ego vehicle;

analyzing the image data and completing semantic waypoint labeling of at least one region of the surrounding environment of the ego vehicle, to determine features of the surrounding environment and a path projection that corresponds to a travel path of the ego vehicle;

receiving one or more object profiles associated with at least one of a dynamic object and a static object based on the features of the surrounding environment;

completing counterfactual scenario augmentation, while the ego vehicle is travelling on the travel path and using a neural network, with respect to the at least one region by inpainting the at least one of the dynamic object and the static object at pixels within the travel path of the ego vehicle in the monocular image based on the one or more object profiles; and determining, in real time while the ego vehicle is travelling on the travel path, at least one driver intention and at least one driver response by the neural network augmented in real time with the counterfactual scenario augmentation of the at least one region, wherein at least one vehicle system is controlled based on at least one of: the at least one driver intention and the at least one driver response, and wherein the inpainted object is generated from a stored object associated with the one or more object profiles.

20. The non-transitory computer readable storage medium of claim 19, wherein determining the at least one driver intention and the at least one driver response associated with the at least one region includes analyzing a road topology of at least one roadway of the surrounding environment of the ego vehicle and the counterfactual augmentation with respect to the at least one region against a pre-trained data set to utilize pre-trained historical data with predicted future observations associated with the travel path of the ego vehicle.

* * * * *